(12) United States Patent
Akella et al.

(10) Patent No.: US 12,466,409 B2
(45) Date of Patent: Nov. 11, 2025

(54) VEHICLE DECELERATION PLANNING

(71) Applicant: Zoox, Inc., Foster City, CA (US)

(72) Inventors: Abishek Krishna Akella, Pleasanton, CA (US); Seyed Mahdi Shamsi, Daly City, CA (US)

(73) Assignee: Zoox, Inc., Foster City, CA (US)

( * ) Notice: Subject to any disclaimer, the term of this patent is extended or adjusted under 35 U.S.C. 154(b) by 140 days.

(21) Appl. No.: 17/334,484

(22) Filed: May 28, 2021

(65) Prior Publication Data
US 2022/0379889 A1    Dec. 1, 2022

(51) Int. Cl.
*B60W 30/18* (2012.01)
*B60W 30/095* (2012.01)
*B60W 40/072* (2012.01)

(52) U.S. Cl.
CPC ...... *B60W 30/181* (2013.01); *B60W 30/0956* (2013.01); *B60W 40/072* (2013.01); *B60W 2552/15* (2020.02); *B60W 2554/802* (2020.02); *B60W 2555/20* (2020.02)

(58) Field of Classification Search
CPC .......... B60W 30/181; B60W 30/0956; B60W 40/072; B60W 2555/20; B60W 2552/15; B60W 2554/802
See application file for complete search history.

(56) References Cited

U.S. PATENT DOCUMENTS

| | | | | |
|---|---|---|---|---|
| 8,744,689 B2* | 6/2014 | Yamakado | ............ | B60W 50/16 701/44 |
| 9,463,795 B2* | 10/2016 | Minemura | ........ | B60W 30/0956 |
| 9,656,667 B2* | 5/2017 | Agnew | ............ | B60W 30/0953 |
| 2004/0099469 A1* | 5/2004 | Koibuchi | .............. | B60T 8/1764 180/421 |
| 2004/0102901 A1* | 5/2004 | Altan | ...................... | G08G 1/165 340/436 |
| 2013/0041567 A1* | 2/2013 | Yamashiro | ................ | B60T 7/22 701/96 |
| 2014/0365078 A1* | 12/2014 | Gerecke | ................. | B62D 7/159 701/41 |

(Continued)

FOREIGN PATENT DOCUMENTS

| | | |
|---|---|---|
| JP | 2020152279 A | 9/2020 |
| KR | 20190102830 A | 9/2019 |

OTHER PUBLICATIONS

PCT Search Report and Written Opinion mailed Sep. 1, 2022 for PCT Application No. PCT/US22/29785, 11 pages.

*Primary Examiner* — Dale W Hilgendorf
*Assistant Examiner* — Frank T Glenn, III
(74) *Attorney, Agent, or Firm* — Lee & Hayes, P.C.

(57) ABSTRACT

Techniques for vehicle deceleration planning are discussed. The techniques include determining a first location and a first velocity of a vehicle. The techniques further include determining a second location and a second velocity of an object. Based on the first location, the second location, the first velocity, and the second velocity, a relative stopping distance between the vehicle and the object can be determined. If the relative stopping distance is less than a threshold distance, the first maximum deceleration value can be increased to a second maximum deceleration value, and the techniques determine a trajectory for the vehicle based at least in part on the second maximum deceleration value.

20 Claims, 4 Drawing Sheets

(56) References Cited

U.S. PATENT DOCUMENTS

| | | | | |
|---|---|---|---|---|
| 2016/0368490 | A1* | 12/2016 | Erban | B60W 50/16 |
| 2017/0158175 | A1* | 6/2017 | Fairfield | G05D 1/0088 |
| 2017/0232967 | A1* | 8/2017 | Tomatsu | G08G 1/096783 |
| | | | | 701/117 |
| 2017/0369055 | A1* | 12/2017 | Saigusa | G08G 1/096775 |
| 2019/0196481 | A1* | 6/2019 | Tay | G01S 17/86 |
| 2019/0291728 | A1* | 9/2019 | Shalev-Shwartz | B60W 10/06 |
| 2020/0108808 | A1* | 4/2020 | Zhou | B60T 8/171 |
| 2020/0339116 | A1 | 10/2020 | Xu | |

\* cited by examiner

VEHICLE DECELERATION PLANNING

BACKGROUND

Planning systems in vehicles, such as autonomous vehicles, may use information associated with objects in an environment and attributes of the environment to determine actions for navigating the vehicle through the environment. For example, vehicle control systems may change the vehicle's speed or direction of travel based on the likelihood that an object may enter the vehicle's driving path and potentially cause an adverse event. It is important for vehicles to monitor the activity of objects in the environment and adjust vehicle operation in response to changes in the location and movement of the objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
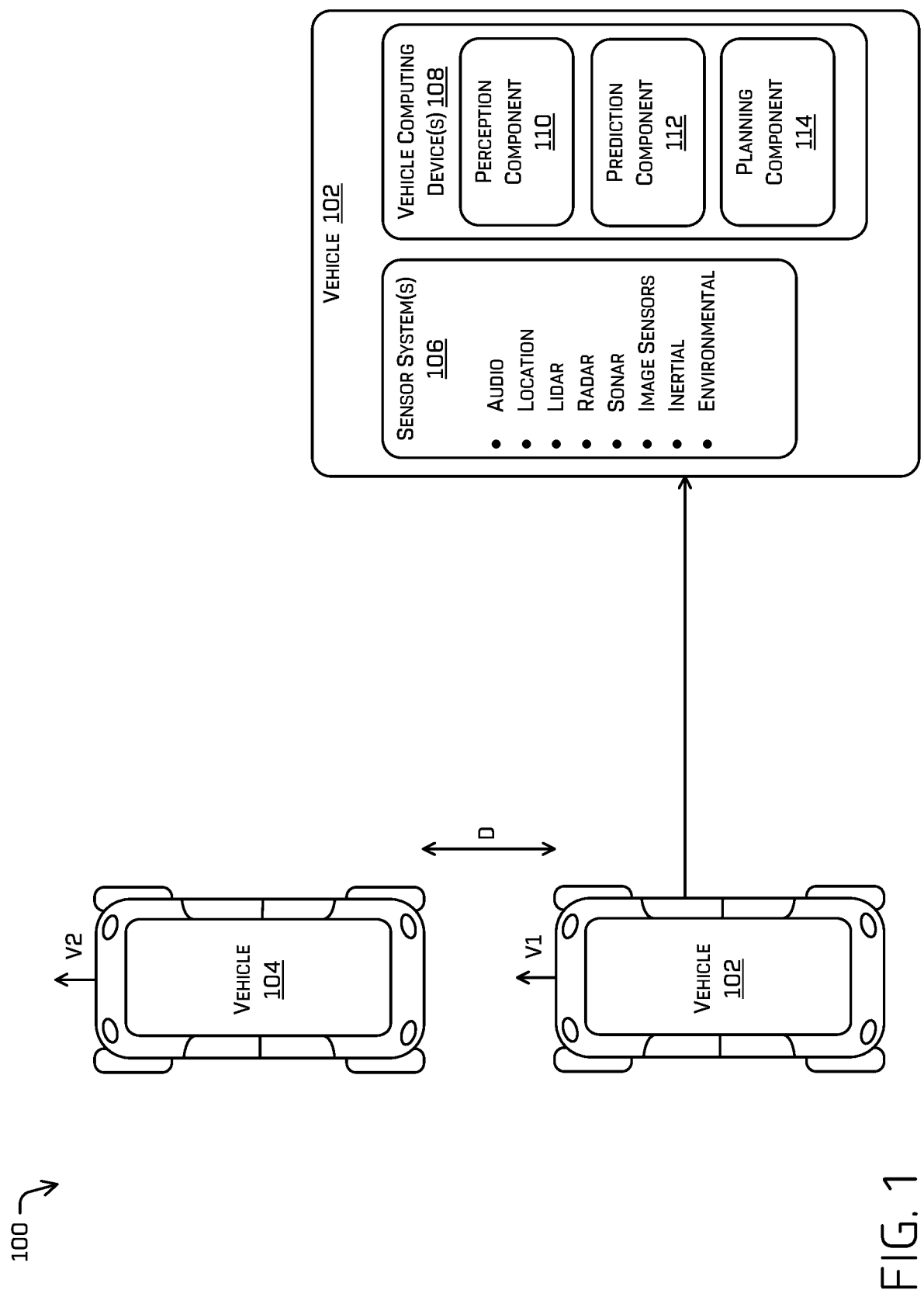
FIG. 1 is a schematic diagram illustrating an example implementation to manage a maximum deceleration rate associated with a vehicle, in accordance with examples of the disclosure.

This disclosure is directed to techniques for determining whether a vehicle's maximum deceleration value should be altered for the current environment in which the vehicle is operating. The vehicle may be an autonomous vehicle with multiple sensors that capture information associated with the current environment. If there is a high likelihood of an adverse event in the current environment, one or more vehicle control systems may alter the vehicle's maximum deceleration value, thereby allowing the vehicle to use increased braking to stop the vehicle faster during a situation with a high risk of an adverse event. The increased braking ability may allow the vehicle to avoid the adverse event. In other examples, such as when another vehicle is following closely behind, it may be safer to decrease the maximum deceleration so as to reduce the probability of being rear-ended.

In some examples, a computing device may determine a first location and a first velocity of a vehicle. The computing device may also determine a second location and a second velocity of an object. Based on the first location, the second location, the first velocity, and the second velocity, a stopping distance or time may be determined between the vehicle and the object if the vehicle applies a first maximum deceleration value. The computing device may further determine whether the stopping distance (or time) is less than a threshold distance (or time). If the stopping distance is less than the threshold distance, then the computing device may increase the first maximum deceleration value to a second maximum deceleration value and determine a trajectory for the vehicle based at least in part on the second maximum deceleration value. In such examples, the vehicle may be able to stop quicker for objects in the road while still ensuring there is sufficient stopping distance or time for the vehicle proceeding behind the vehicle.

In some examples, the computing device may determine the stopping distance by also considering at least one of a maximum possible deceleration of the object, road conditions, or lighting conditions. In some examples, the computing device may determine an acceleration or deceleration of the vehicle as well as an acceleration or deceleration of the object. Determining the stopping distance between the vehicle and the object may be further based on the acceleration or deceleration of the vehicle and the acceleration or deceleration of the object. In some examples, the computing device may further reduce at least one of a maximum steering rate or a maximum steering angle in response to increasing a first maximum deceleration value to a second maximum deceleration value. In some examples, the computing device may calculate or otherwise determine a distance between a vehicle and an object after both the vehicle and the object have come to a stop. This calculation may be based on one or more of an initial distance between the vehicle and the object, a maximum deceleration of the vehicle, a maximum deceleration of the object, an initial velocity of the vehicle, an initial velocity of the object, road conditions, or weather conditions.

In similar examples, if the stopping distance or time is not above some given threshold distance or time (e.g., indicating a high probability that decelerating at the first rate may result in being rear-ended by the following vehicle), the maximum deceleration rate may be decreased. In various such examples, the threshold distance/time may be based at least in part on an object type (e.g., a small car, large truck, motorcycle, tractor trailer, etc.) and an associated maximum deceleration rate associated with the following vehicle type.

In some examples, a computing device may determine a first location associated with a first vehicle and determine a second location associated with a second vehicle. The computing device may further determine a first velocity associated with the first vehicle and a second velocity associated with the second vehicle. A stopping distance of the first vehicle may be determined using a first maximum deceleration value based on the first location, the second location, the first velocity, and the second velocity. The stopping distance (or stopping time) may be compared to a threshold distance. If the stopping distance (or time) is less than the threshold distance, the computing device may increase the first maximum deceleration value to a second maximum deceleration value. The computing device may further determine a trajectory for the first vehicle based at least in part on the second maximum deceleration value.

The techniques discussed herein can improve the functioning of a vehicle by supporting variable maximum deceleration values based on the current environment. As discussed herein, increasing a first maximum deceleration value to a second maximum deceleration value can be a preemptive activity that allows the vehicle to use harder braking if needed to avoid an adverse event. Thus, instead of waiting for a high-risk situation to occur, the vehicle is already prepared to apply increased braking if needed to avoid a potential adverse event. Although the vehicle may be permitted to use a higher maximum deceleration value, the vehicle does not necessarily use the maximum deceleration value unless needed in a particular situation to avoid an adverse event or otherwise maintain the safety of the vehicle and its occupants or other contents. This improves the overall comfort to the vehicle occupants by avoiding use of the highest deceleration rate until it is needed.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using audio data. Additionally, the techniques described herein can be used with real data (e.g., captured using sensor(s)), simulated data (e.g., generated by a simulator), or any combination of the two.

FIG. 1 is a schematic diagram illustrating an example implementation 100 to manage a maximum deceleration rate associated with a vehicle, in accordance with examples of the disclosure. As illustrated in FIG. 1, a first vehicle 102 is separated from a second vehicle 104 by a distance D. In the example of FIG. 1, the first vehicle 102 is traveling in a forward direction at a first velocity V1. The second vehicle 104 is also traveling in a forward direction at a second velocity V2. In some examples, the first velocity V1 and the second velocity V2 may be similar to one another such that the first vehicle 102 and the second vehicle 104 maintain a similar distance D from one another over a period of time. In some examples, the current acceleration (or deceleration) of the first vehicle 102 and the second vehicle 104 are known, which may also be used to estimate a stopping distance of each vehicle.

For the purpose of illustration, the first vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the first vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details regarding the first vehicle 102 are described herein.

In some examples, the first vehicle 102 may include any number of sensor systems 106. For example, the sensor system(s) 106 can include audio sensors (e.g., microphones), location sensors (e.g., global positioning system (GPS), compass, etc.), light detection and ranging (lidar) sensors, radio detection and ranging (radar) sensors, sound navigation and ranging (sonar) sensors, image sensors (e.g., cameras), inertial sensors (e.g., inertial measurement units, accelerometers, magnetometers, gyroscopes, etc.), environmental sensors (e.g., temperature sensors, humidity sensors, light sensors, pressure sensors, etc.), and the like. In some examples, the sensor system(s) 106 can generate sensor data, which may be utilized by vehicle computing device(s) 108 associated with the first vehicle 102. For example, the generated sensor data may be used to detect objects located near first vehicle 102 and information associated with the objects. The information associated with an object may include a category or type of object, an object's location, an object's velocity, an object's direction of travel, and the like.

In at least one example, the vehicle computing device(s) 108 may receive and process data received from the multiple sensor systems 106 to determine information associated with an object, such as the second vehicle 104. The vehicle computing device(s) 108 may monitor the speed, location, and trajectory of the second vehicle 104. If the vehicle computing device(s) 108 detect any changes in the speed, location, or trajectory of the second vehicle 104, the vehicle computing device(s) may make necessary adjustments to the operation of the first vehicle 102 to maintain a safe distance from the second vehicle 104, avoid a possible adverse event, and the like.

In some examples, the vehicle computing device(s) 108 of the first vehicle 102 may include a perception component 110, a prediction component 112, and a planning component 114. As discussed herein, the perception component 110 may include functionality to perform object detection, segmentation, and/or classification. In some examples, the perception component 110 may provide processed sensor data that indicates a presence of an entity that is proximate to the first vehicle 102 and/or a classification of the entity as an entity type (e.g., car, pedestrian, cyclist, animal, building, tree, road surface, curb, sidewalk, unknown, etc.). In additional or alternative examples, the perception component 110 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, a deceleration of the entity, an extent of the entity (size), etc.

In some examples, the prediction component 112 may include functionality to generate one or more probability maps representing prediction probabilities of possible locations of one or more objects in an environment. For example, the prediction component 112 can generate one or more probability maps for vehicles, pedestrians, animals, and the like within a threshold distance from the vehicle 102. In some instances, the prediction component 112 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment. In some examples, prediction component 112 may predict sudden deceleration of another vehicle, sudden movements of an object into the path of the vehicle implementing the prediction component 112, current vehicle acceleration, and the like.

In some examples, the planning component 114 may include functionality to determine a path for the first vehicle 102 to follow to traverse through an environment. For example, the planning component 114 can determine various routes and paths and various levels of detail. In some instances, the planning component 114 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 114 can generate an instruction for guiding the autonomous vehicle along at least a portion of the route from the first location to the second location. In at least one example, the planning component 114 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle. Further, the maximum deceleration values discussed herein may be used when determining a route of travel and determining operation of the vehicle.

In other examples, the planning component 114 can alternatively, or additionally, use data from the perception component 110 and/or the prediction component 112 to determine a path for the first vehicle 102 to follow to traverse through an environment. For example, the planning component 114 can receive data from the perception component 110 and/or the prediction component 112 regarding objects associated with an environment. Using this data, the planning component 114 can determine a route to travel from a first location (e.g., a current location) to a second location (e.g., a target location) to avoid objects in an environment. In at least some examples, such a planning component 114 may determine there is no such collision free path and, in turn, provide a path which brings first vehicle 102 to a safe stop avoiding all collisions and/or otherwise mitigating damage. In some examples, the planning component 114 may determine a route, or revise an existing route, for a vehicle based on a predicted (e.g., predicted by prediction component 112) sudden deceleration of another vehicle, sudden movements of an object into the path of the vehicle, and the like.

Figure 2:
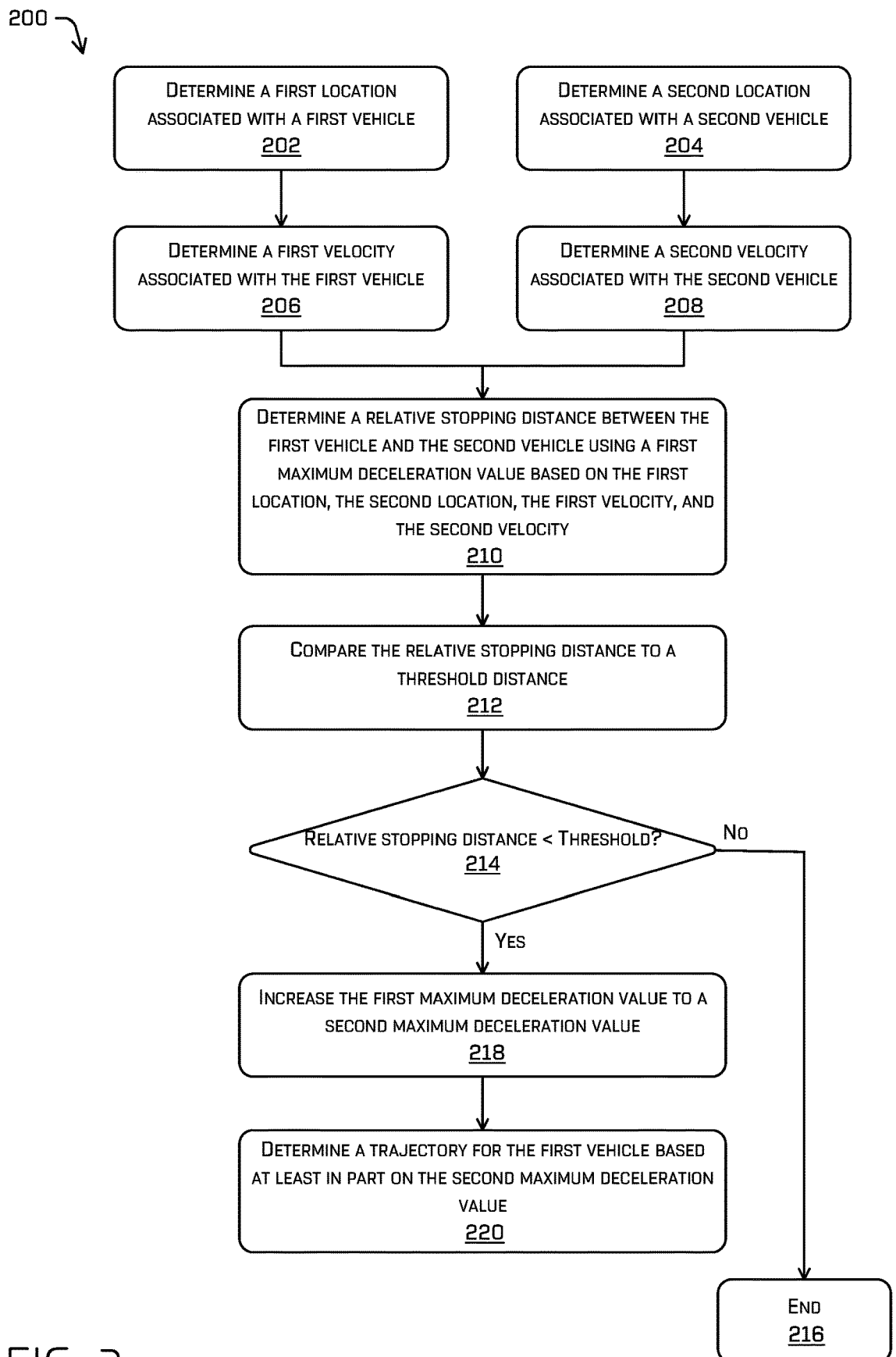
FIG. 2 is an illustration of an example process for determining a maximum deceleration value associated with a vehicle, in accordance with examples of the disclosure.

FIG. 2 is an illustration of an example process 200 for determining a maximum deceleration value associated with a vehicle, in accordance with examples of the disclosure. The operations described herein with respect to the process 200 may be performed by the vehicle computing device(s) 108, as illustrated in FIG. 1. In some examples, the operations may be performed by the perception component 110, the prediction component 112, or the planning component 114 of the vehicle computing device(s) 108, as discussed herein.

By way of example, the process 200 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 200. In some examples, multiple branches represent alternate implementations that may be used separately or in combination with other operations discussed herein.

At operation 202, the process may include determining a first location associated with a first vehicle, such as the first vehicle 102 shown in FIG. 1. For example, the location of the first vehicle may be determined using a location sensor discussed with respect to FIG. 1.

At operation 204, the process may include determining a second location associated with a second vehicle, such as the second vehicle 104 shown in FIG. 1. In some examples, the second location can be determined relative to the location of the first vehicle 102. For example, if process 200 is being performed by the vehicle computing device(s) 108 of the first vehicle 102, the second location may be determined using one or more sensors of the first vehicle 102 to determine the distance and direction to the second location relative to the first location.

At operation 206, the process may include determining a first velocity associated with the first vehicle, such as the first vehicle 102 shown in FIG. 1. For example, the velocity of the first vehicle may be determined using sensors or other systems associated with the first vehicle 102. In some examples, the velocity of the first vehicle may be determined based on vehicle state information, a planned driving route, and the like.

At operation 208, the process may include determining a second velocity associated with the second vehicle, such as the second vehicle 104 shown in FIG. 1. In some examples, the second velocity can be determined relative to the velocity of the first vehicle. For example, if process 200 is being performed by the vehicle computing device(s) 108 of the first vehicle 102, the second velocity may be determined using one or more sensors of the first vehicle 102 to determine the velocity of second vehicle 104.

At operation 210, the process may include determining a relative stopping distance between the first vehicle and the second vehicle using a first maximum deceleration value based on the first location, the second location, the first velocity, and the second velocity. In some examples, the relative stopping distance of the first vehicle may be further based on additional factors such as road conditions, weather conditions, number of occupants in the vehicle, weight of packages or other items in the vehicle, grade (or slope) of the road surface, road curvature, and the like. In some examples, determining the relative stopping distance may be based on a maximum stopping rate associated with the second vehicle or an estimated reaction time of the first vehicle (e.g., the time it takes for the first vehicle to initiate a braking action in response to a decision to slow the first vehicle). In some examples, the stopping distance of a particular vehicle may be determined based on the known braking ability of the vehicle, the current vehicle speed, the current vehicle acceleration (or deceleration), and the like. The estimated reaction time may be an estimated human driver reaction time or an estimated autonomous driving system reaction time.

Although particular examples discussed herein refer to stopping distances and relative stopping distances, similar systems and methods may be used to determine a stopping time for the first vehicle and the second vehicle. For example, the stopping time may include 1) an expected stopping time associated with a first vehicle using a particular maximum deceleration value, and 2) an expected stopping time associated with a second vehicle using a maximum expected deceleration rate. Based on the expected stopping time of each vehicle, the systems and methods described herein can determine whether the two vehicle will stop at a safe distance from one another (e.g., greater than a threshold value) or may stop too close to one another and possibly cause an adverse event.

In some examples, the process 200 may assume a worst-case scenario for the second vehicle 104 and other factors when determining a relative stopping distance at operation

210. For example, process 200 may add a lag time in applying the brakes by the first vehicle and may assume that the second vehicle stops suddenly using its maximum braking ability. Additionally, the process 200 may consider other factors when calculating a relative stopping distance, such as a theoretical maximum deceleration of the second vehicle, a current speed limit, road conditions (e.g., wet, dry, ice, snow, etc.), and the like.

At operation 212, the process may include comparing the relative stopping distance to a threshold distance. For example, the threshold distance may include a safe stopping distance between the first vehicle and the second vehicles, such as five feet. In some examples, the threshold distance is identified as a safe distance between vehicles that is not likely to result in an adverse event. As mentioned above, instead of considering the relative stopping distance, the described systems and methods may alternatively determine a stopping time for the first vehicle and the second vehicle. Based on the stopping time for each vehicle, the systems and methods may determine a distance between the two vehicles when both of the vehicles have come to a stop.

At operation 214, the process may determine whether the relative stopping distance of the first vehicle is less than the threshold value. In some examples, if the relative stopping distance is less than the threshold value, the process 200 may identify the current situation as having a high likelihood of an adverse event. However, if the relative stopping distance is greater than (or equal to) the threshold value, the first vehicle may continue operating with the first maximum deceleration value. In this situation, the process 200 ends at 216.

If the relative stopping distance is less than the threshold value, the process may increase the first maximum deceleration value to a second maximum deceleration value at operation 218. In some examples, the second maximum deceleration value is greater than the first maximum deceleration value and typically allows the first vehicle to stop faster (i.e., stop in a shorter distance). Although the higher deceleration rate may be less comfortable to the occupants of the vehicle, it may reduce the likelihood of an adverse event. In some examples, the first maximum deceleration value is associated with a comfort driving level and the second maximum deceleration value is associated with a maximum stopping level.

At operation 220, the process may include determining a trajectory for the first vehicle based at least in part on the second maximum deceleration value. In some examples, the trajectory for the first vehicle may include applying braking up to the second maximum deceleration value. In other examples, the trajectory for the first vehicle may include additional activities in addition to braking or instead of braking. The additional activities may include steering the vehicle, generating a warning to occupants that the vehicle is stopping quickly, and the like. In some examples, determining the trajectory for the first vehicle may be based at least in part on a cost associated with the second maximum deceleration value.

In some examples, the first maximum deceleration value and the second maximum deceleration value may be based on a vehicle type or a vehicle classification.

Increasing the first maximum deceleration value to the second maximum deceleration value does not necessarily cause the vehicle to apply harder braking. Increasing the maximum deceleration value gives the vehicle the ability to apply harder braking in a high-risk situation, but the vehicle may not necessarily use the maximum deceleration value unless the vehicle computing devices (e.g., the prediction component and the planning component) determine that the maximum deceleration value is necessary to avoid an adverse event. In some examples, increasing the first maximum deceleration value to the second maximum deceleration value is a preemptive activity that allows the vehicle to use harder braking if needed to avoid an adverse event.

In some examples, the first maximum deceleration value is approximately −4 m/s$^2$ and the second maximum deceleration value is approximately −5.5 m/s$^2$. In other examples, any value can be used for the first maximum deceleration value and the second maximum deceleration value.

In some examples, the systems and methods described herein calculate a final distance between the first vehicle and the second vehicle after both vehicles have stopped. For example, this final distance between the first vehicle and the second vehicle may be calculated based on the initial distance between the first vehicle and the second vehicle (before either vehicle begins decelerating), the initial velocity of the first vehicle, the initial velocity of the second vehicle, the maximum deceleration of the first vehicle, the maximum deceleration of the second vehicle, road conditions, weather conditions, and the like. If the calculated final distance between the first vehicle and the second vehicle is a positive number, then both vehicles can stop without coming in contact with each other. However, if the calculated distance between the first vehicle and the second vehicle is zero (or less than zero), then an adverse event will likely occur, such as a physical impact of the two vehicles.

In some examples, the systems and methods described herein may identify additional actions to take that can avoid an adverse event between the first vehicle and the second vehicle. These additional actions may be performed in addition to braking by the first vehicle or instead of braking by the first vehicle. For example, prediction component 112 and/or planning component 114 may identify other actions for the first vehicle, such as changing lanes. In this example, the first vehicle may change lanes to avoid the second vehicle while simultaneously braking to slow the velocity of the first vehicle.

In some examples, when the first vehicle is turning and braking simultaneously, the systems and methods described herein may limit the maximum steering angle or the maximum steering rate of the first vehicle to avoid loss of control, such as a spin out or rollover of the first vehicle. The maximum steering angle may refer to the maximum angle the wheels can be turned from the "straight ahead" position. The maximum steering rate may refer to the speed at which the wheels are turned from an initial steering angel.

For example, if the first vehicle's maximum deceleration value is increased to the second maximum deceleration value, the first vehicle's maximum steering angle may be decreased to maintain control of the vehicle during hard braking. Similarly, if the first vehicle's maximum deceleration value is increased to the second maximum deceleration value, the first vehicle's maximum steering rate may be decreased to maintain control of the vehicle during hard braking. In some examples, both the maximum steering angle and the maximum steering rate are decreased to maintain vehicle control.

In the examples discussed herein, two different maximum deceleration values are described (e.g., a first maximum deceleration value and a second maximum deceleration value). However, in other examples, any number of different maximum deceleration values may be used by a particular vehicle.

Figure 3:
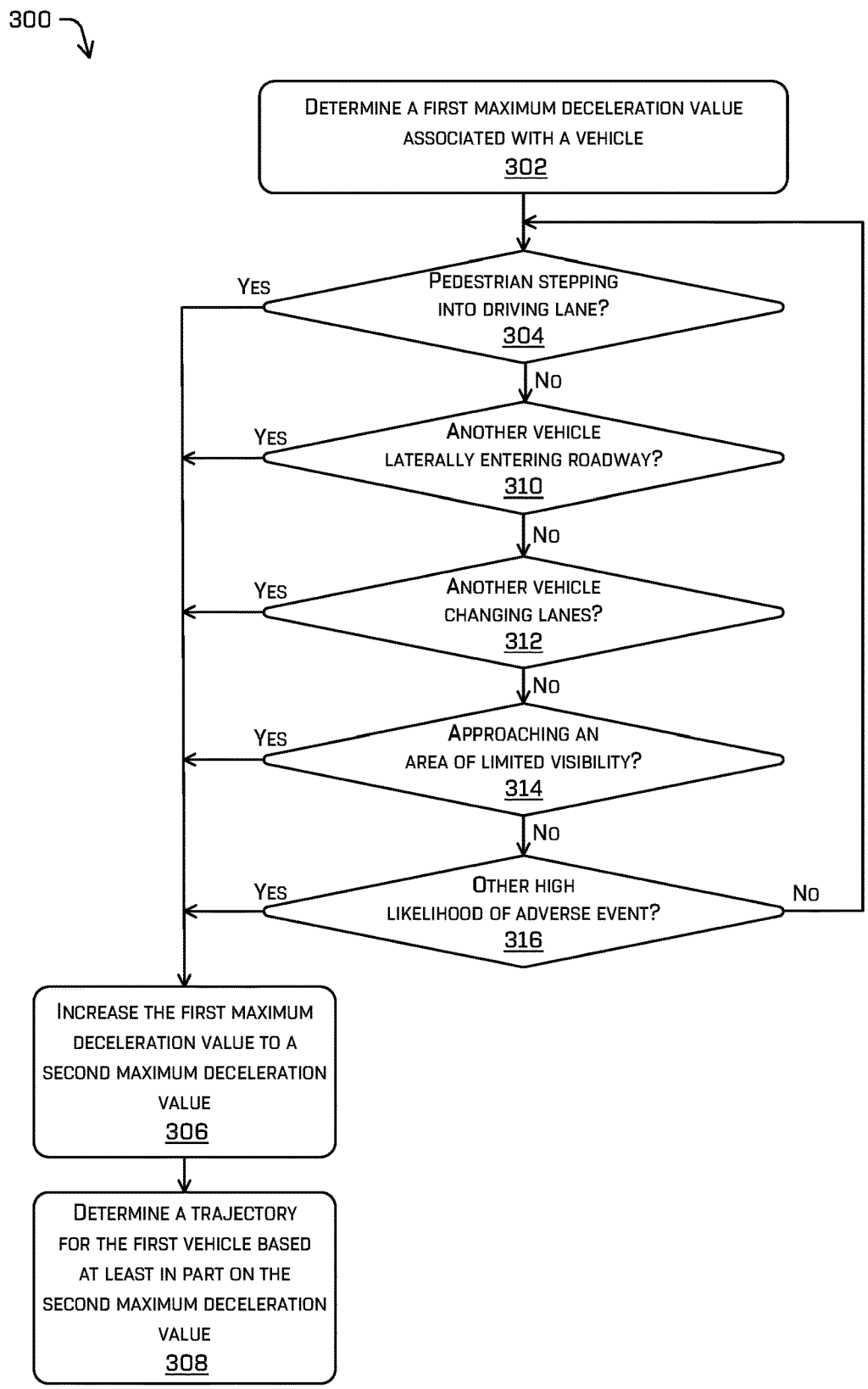
FIG. 3 is an illustration of an example process for adjusting a maximum deceleration value associated with a vehicle, in accordance with examples of the disclosure.

FIG. 3 is an illustration of an example process 300 for adjusting a maximum deceleration value associated with a vehicle, in accordance with examples of the disclosure. The operations described herein with respect to the process 300 may be performed by the vehicle computing device(s) 108, as illustrated in FIG. 1. In some examples, the operations may be performed by the perception component 110, the prediction component 112, or the planning component 114 of the vehicle computing device(s) 108, as discussed herein.

By way of example, the process 300 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 300. In some examples, multiple branches represent alternate implementations that may be used separately or in combination with other operations discussed herein.

At operation 302, the process may include determining a first maximum deceleration value associated with a vehicle. For example, the first maximum deceleration value may be a default value that is used during normal vehicle operation.

At operation 304, the process may include determining whether a pedestrian is stepping into a driving lane of the vehicle or the pedestrian is likely to step into the driving lane. For example, a pedestrian walking along a sidewalk may be a lower risk of stepping into the driving lane than a pedestrian who has turned toward the driving lane and appears to be stepping toward or into the driving lane. If the process 300 determines that the pedestrian is not likely to step into the driving lane, the system may continue using the first maximum deceleration value.

However, if the process 300 determines that the pedestrian is stepping into the driving lane, or likely to step into the driving lane, the process 300 continues to operation 306, where the first maximum deceleration value may be increased to a second maximum deceleration value. The second maximum deceleration value may be greater than the first maximum deceleration value, thereby allowing the vehicle to decelerate faster (e.g., by applying harder braking) in case of a high-risk situation.

At operation 308, the process may include determining a trajectory of the vehicle based at least in part on the second maximum deceleration value. As discussed herein with respect to FIG. 2, the trajectory for the vehicle may include applying braking up to the second maximum deceleration value. In other examples, the trajectory for the vehicle may include additional activities in addition to braking or instead of braking. The additional activities may include steering the vehicle, generating a warning to occupants that the vehicle is stopping quickly, and the like.

At operation 310, the process may include determining whether another vehicle is laterally entering the roadway (e.g., from a side street, intersection, junction, alley, driveway, parking lot, and the like). Since this situation may present a higher risk to the vehicle, the process 300 may continue to operation 306, where the first maximum deceleration value may be increased to a second maximum deceleration value.

At operation 312, the process may include determining whether another vehicle is changing lanes (e.g., changing lanes into the driving lane being used by the vehicle. This situation may present a higher risk to the vehicle. Thus, the process 300 may continue to operation 306, where the first maximum deceleration value may be increased to a second maximum deceleration value.

At operation 314, the process may include determining whether the vehicle is approaching an area of limited visibility. Since the limited visibility may present a higher risk to the vehicle, the process 300 may continue to operation 306, where the first maximum deceleration value may be increased to a second maximum deceleration value.

At operation 316, the process may include determining whether any other factors are present that indicate a high likelihood of an adverse event. If there is a high likelihood of an adverse event, the process 300 may continue to operation 306, where the first maximum deceleration value may be increased to a second maximum deceleration value.

As discussed above, increasing the first maximum deceleration value to the second maximum deceleration value does not necessarily cause the vehicle to apply harder braking. Increasing the maximum deceleration value gives the vehicle the ability to apply harder braking in a high-risk situation, but the vehicle may not necessarily use the maximum deceleration value unless the vehicle computing devices (e.g., the prediction component and the planning component) determine that the maximum deceleration value is necessary to avoid an adverse event.

In some examples, other situations (e.g., situations with a high likelihood of an adverse event) may cause a vehicle control system to increase the first maximum deceleration value to a second maximum deceleration value. Other situations may include a bicyclist riding in a lane of traffic, identification of another vehicle that is predicted to cut in front of the vehicle performing the determination, a vehicle that is predicted to go out-of-turn at an intersection, and the like.

Examples of determining trajectories are provided in U.S. Pat. No. 10,831,210, titled "Trajectory Generation and Optimization Using Closed-Form Numerical Integration in Route-Relative Coordinates," filed Nov. 10, 2020, the entirety of which is herein incorporated by reference for all purposes.

Examples of determining vehicle trajectories are provided in U.S. Pat. No. 10,133,275, titled "Trajectory Generation Using Temporal Logic and Tree Search," filed Nov. 20, 2018, the entirety of which is herein incorporated by reference for all purposes.

Examples of vehicle control systems and methods are provided in U.S. patent application Ser. No. 16/251,788, titled "Vehicle Control," filed Jan. 18, 2019, the entirety of which is herein incorporated by reference for all purposes.

Figure 4:
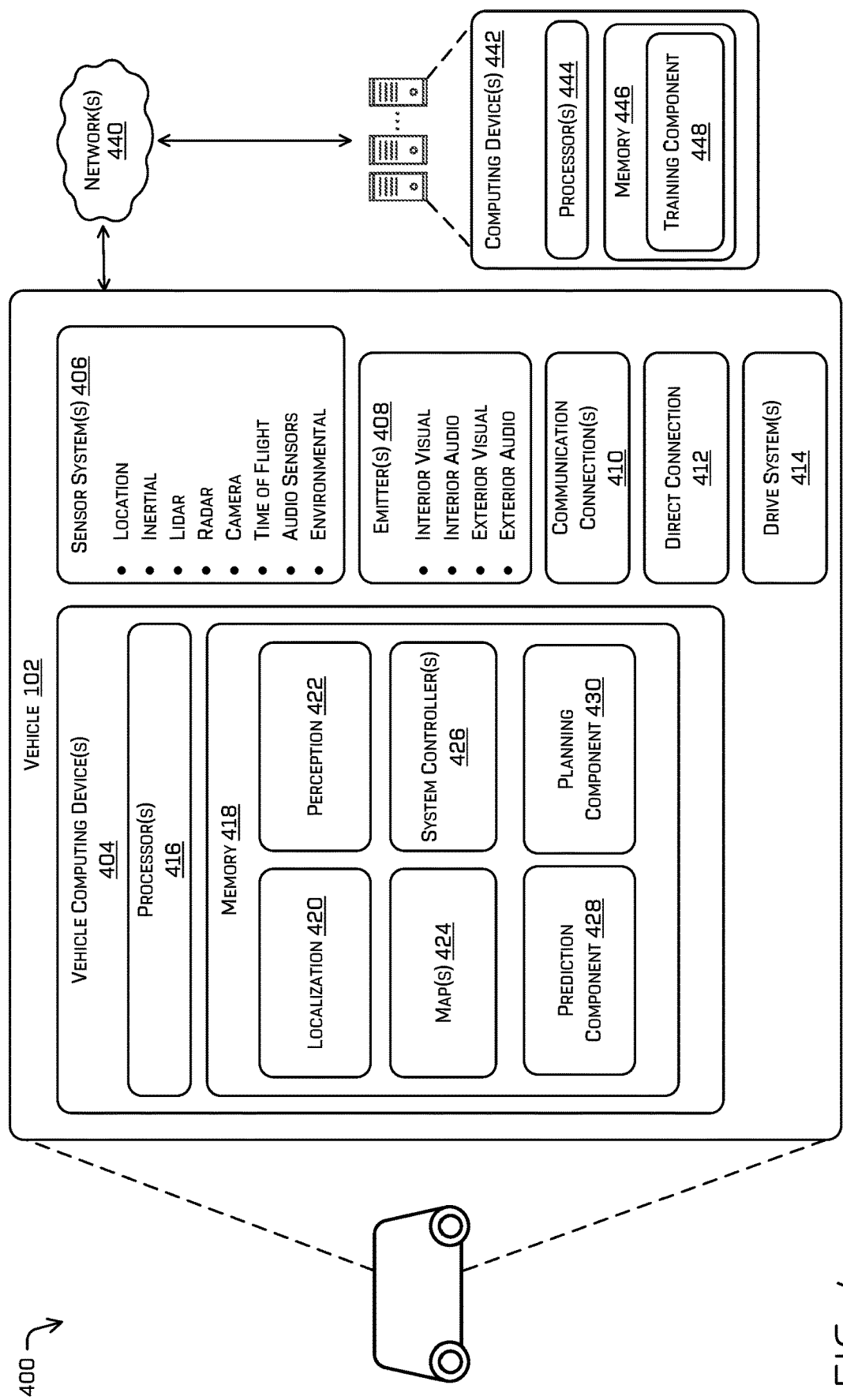
FIG. 4 is an illustration of an example system for implementing the techniques described herein.

FIG. 4 depicts a block diagram of an example system 400 for implementing the techniques described herein. The vehicle 102 may include one or more vehicle computing devices 404 (also referred to as a vehicle computing device 404 or vehicle computing device(s) 404), one or more sensor systems 406, one or more emitters 408, one or more communication connections 410, at least one direct connection 412, and one or more drive systems 414.

The vehicle computing device 404 may include one or more processors 416 and memory 418 communicatively coupled with the one or more processors 416. In the illustrated example, the vehicle 102 is an autonomous vehicle; however, the vehicle 102 could be any other type of vehicle. In the illustrated example, the memory 418 of the vehicle computing device 404 stores a localization component 420, a perception component 422, one or more maps 424, one or more system controllers 426, a prediction component 428, and a planning component 430. Though depicted in FIG. 4 as residing in memory 418 for illustrative purposes, it is contemplated that the localization component 420, the perception component 422, the one or more maps 424, the one or more system controllers 426, the prediction component 428, and the planning component 430 may additionally, or alternatively, be accessible to the vehicle 102 (e.g., stored remotely).

In at least one example, the localization component 420 may include functionality to receive data from the sensor system(s) 406 to determine a position and/or orientation of the vehicle 102 (e.g., one or more of an x-, y-, z-position, roll, pitch, or yaw). For example, the localization component 420 may include and/or request/receive a map of an environment and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 102 to determine an initial position of an autonomous vehicle for generating a trajectory and/or for generating or receiving map data, as discussed herein.

In some instances, the perception component 422 may include functionality to perform object detection, segmentation, and/or classification. In some examples, the perception component 422 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 422 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, a deceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 418 may further include one or more maps 424 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 424 may include at least one map (e.g., images and/or a mesh). In some examples, the vehicle 102 may be controlled based at least in part on the map(s) 424. In some examples, the one or more maps 424 may be stored on a remote computing device(s) (such as the computing device(s) 442) accessible via network(s) 440. In some examples, multiple maps 424 may be stored based on, for example, a characteristic (e.g., type of entity, time of day, day of week, season of the year, etc.). Storing multiple maps 424 may have similar memory requirements but increase the speed at which data in a map may be accessed.

In at least one example, the vehicle computing device 404 may include one or more system controllers 426, which may be configured to control steering, propulsion, braking, safety, emitters, communication, and other systems of the vehicle 102. These system controller(s) 426 may communicate with and/or control corresponding systems of the drive system(s) 414 and/or other components of the vehicle 102.

In some examples, the prediction component 428 may include functionality to generate one or more probability maps representing prediction probabilities of possible locations of one or more objects in an environment. For example, the prediction component 428 can generate one or more probability maps for vehicles, pedestrians, animals, and the like within a threshold distance from the vehicle 102. In some instances, the prediction component 428 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the planning component 430 may include functionality to determine a path for the vehicle 102 to follow to traverse through an environment. For example, the planning component 430 can determine various routes and paths and various levels of detail. In some instances, the planning component 430 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 430 can generate an instruction for guiding the autonomous vehicle along at least a portion of the route from the first location to the second location. In at least one example, the planning component 430 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 430 can alternatively, or additionally, use data from the perception component 422 and/or the prediction component 428 to determine a path for the vehicle 102 to follow to traverse through an environment. For example, the planning component 430 can receive data from the perception component 422 and/or the prediction component 428 regarding objects associated with an environment. Using this data, the planning component 430 can determine a route to travel from a first location (e.g., a current location) to a second location (e.g., a target location) to avoid objects in an environment. In at least some examples, such a planning component 430 may determine there is no such collision free path and, in turn, provide a path which brings vehicle 102 to a safe stop avoiding all collisions and/or otherwise mitigating damage. In some examples, the planning component 430 may consider a maximum deceleration value setting for vehicle 102, as discussed herein, when planning a route for vehicle 102 and when avoiding adverse events.

In some instances, aspects of some or all of the components discussed herein may include any models, algorithms, and/or machine learning algorithms. For example, in some instances, the components in the memory 418 (and the memory 446, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 406 may provide input to the vehicle computing device 404. Additionally, or alternatively, the sensor system(s) 406 may send sensor data, via the one or more networks 440, to the one or more computing device(s) at a particular frequency, after a lapse of a predetermined period of time, in near real-time, etc.

The vehicle 102 may also include one or more emitters 408 for emitting light and/or sound, as described above. The emitters 408 in this example include interior audio and visual emitters to communicate with passengers (or occupants) of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 410 that enable communication between the vehicle 102 and one or more other local or remote computing device(s). For instance, the communication connection(s) 410 may facilitate communication with other local computing device(s) on the vehicle 102 and/or the drive system(s) 414. Also, the communication connection(s) 410 may allow the vehicle to communicate with other nearby computing device(s) (e.g., other nearby vehicles, traffic signals, etc.). The communications connection(s) 410 also enable the vehicle 102 to communicate with a remote teleoperation computing device or other remote services.

The communications connection(s) 410 may include physical and/or logical interfaces for connecting the vehicle computing device 404 to another computing device or a network, such as network(s) 440. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 414. In some examples, the vehicle 102 may have a single drive system 414. In at least one example, if the vehicle 102 has multiple drive systems 414, individual drive systems 414 may be positioned on opposite ends of the vehicle 102 (e.g., the front and the rear, etc.). In at least one example, the drive system(s) 414 may include one or more sensor systems to detect conditions of the drive system(s) 414 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 102 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 may provide a physical interface to couple the one or more drive system(s) 414 with the body of the vehicle 102. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 102.

In some examples, the vehicle 102 may send sensor data to one or more computing device(s) 442 via the network(s) 440. In some examples, the vehicle 102 may send raw sensor data to the computing device(s) 442. In other examples, the vehicle 102 may send processed sensor data and/or representations of sensor data to the computing device(s) 442. In some examples, the vehicle 102 may send sensor data to the computing device(s) 442 at a particular frequency, after a lapse of a predetermined period of time, in near real-time, etc. In some cases, the vehicle 102 may send sensor data (raw or processed) to the computing device(s) 442 as one or more log files. The computing device(s) 442 may include processor(s) 444 and a memory 446 storing a training component 448.

In some examples, the training component 448 may include training data that has been generated by a simulator. For example, simulated training data may represent examples of testing objects in an environment, to provide additional training examples.

The processor(s) 416 of the vehicle 102 and the processor(s) 444 of the computing device(s) 442 may be any suitable processor capable of executing instructions to process data and perform operations as described herein. By way of example and not limitation, the processor(s) 416 and 444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 446 are examples of non-transitory computer-readable media. The memory 418 and 446 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 446 may include at least a working memory and a storage memory. For example, the working memory may be a high-speed memory of limited capacity (e.g., cache memory) that is used for storing data to be operated on by the processor(s) 416 and 444. In some instances, the memory 418 and 446 may include a storage memory that may be a lower-speed memory of relatively large capacity that is used for long-term storage of data. In some cases, the processor(s) 416 and 444 may not operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 102 may be associated with the computing device(s) 442 and/or components of the computing device(s) 442 may be associated with the vehicle 102. That is, the vehicle 102 may perform one or more of the functions associated with the computing device(s) 442, and vice versa.

Example Clauses

A. A system comprising: one or more processors; and one or more non-transitory computer-readable media storing instructions executable by the one or more processors, wherein the instructions, when executed, cause the system to perform operations comprising: determining a first location and a first velocity associated with a first vehicle; determining a second location and a second velocity associated with a second vehicle; determining, based on the first location, the second location, the first velocity, the second velocity, and a first maximum deceleration value, a relative stopping distance between the first vehicle and the second vehicle; determining that the relative stopping distance is less than or equal to a threshold distance; and responsive to determining that the relative stopping distance is less than the threshold distance: increasing the first maximum deceleration value to a second maximum deceleration value; and determining a trajectory for the first vehicle based at least in part on the second maximum deceleration value.

B. The system of paragraph A, the operations further comprising: determining a first acceleration of the first vehicle; and determining a second acceleration of the second vehicle, wherein determining the relative stopping distance between the first vehicle and the second vehicle is further based on the first acceleration and the second acceleration.

C. The system of paragraph B, wherein: the second acceleration of the second vehicle is determined based at least in part on an object type of the second vehicle.

D. The system of any of paragraphs A-C, wherein: determining the relative stopping distance between the first vehicle and the second vehicle is further based on a maximum stopping rate by the second vehicle and an estimated reaction time associated with the first vehicle.

E. The system of any of paragraphs A-D, wherein: determining the relative stopping distance between the first vehicle and the second vehicle is further based on at least one of a maximum possible deceleration of the second vehicle, road conditions, road slope, road curvature, human reaction time, or lighting conditions.

F. A method comprising: determining a first location and a first velocity of a vehicle; determining a second location of an object in an environment proximate the vehicle; determining, based on the first location, the second location, and the second velocity, a relative stopping distance between the vehicle and the object; determining that the relative stopping distance is less than a threshold distance; and responsive to determining that the relative stopping distance is less than the threshold distance: increasing a first maximum deceleration value to a second maximum deceleration value; and determining a trajectory for the vehicle based at least in part on the second maximum deceleration value.

G. The method of paragraph F, wherein: determining the relative stopping distance between the vehicle and the object is further based on at least one of a maximum possible deceleration of the object, road conditions, road slope, road curvature, human reaction time, or lighting conditions.

H. The method of paragraph F or G, further comprising: determining a first acceleration of the first vehicle; and determining a second acceleration of the object, wherein determining the relative stopping distance between the first vehicle and the object is further based on the first acceleration and the second acceleration.

I. The method of paragraph H, wherein: determining a second acceleration of the object is based at least in part on an object type of the object.

J. The method of paragraph H or I, wherein: the first acceleration or the second acceleration is a deceleration.

K. The method of any of paragraphs F-J, further comprising: reducing at least one of a maximum steering rate or a maximum steering angle responsive to increasing the first maximum deceleration value to a second maximum deceleration value.

L. The method of any of paragraphs F-K, wherein the object is a second vehicle traveling in front of the vehicle or behind the vehicle.

M. The method of any of paragraphs F-L, wherein: determining the relative stopping distance between the vehicle and the object is further based on at least one of a number of occupants in the vehicle, a weight of vehicle, weather conditions, or road conditions.

N. The method of any of paragraphs F-M, wherein: determining the relative stopping distance is based on one or more of an initial distance between the vehicle and the object, a maximum deceleration of the vehicle, a maximum deceleration of the object, an initial velocity of the vehicle, an initial velocity of the object, road conditions, or weather conditions.

O. The method of any of paragraphs F-N, wherein: determining a trajectory is further based on a cost associated with the second maximum deceleration value.

P. The method of any of paragraphs F-O, wherein: determining the relative stopping distance between the vehicle and the object is further based on a maximum stopping rate associated with the object and an estimated reaction time associated with the vehicle.

Q. One or more non-transitory computer-readable media storing instructions that, when executed, cause one or more processors to perform operations comprising: determining a first location and a first velocity of a vehicle; determining a second location and a second velocity of an object; determining, based on the first location, the second location, the first velocity, and the second velocity, a relative stopping distance between the vehicle and the object; determining that the relative stopping distance is less than a threshold distance; and responsive to determining that the relative stopping distance is less than the threshold distance: increasing a first maximum deceleration value to a second maximum deceleration value; and determining a trajectory for the vehicle based at least in part on the second maximum deceleration value.

R. The one or more non-transitory computer-readable media of paragraph Q, the operations further comprising: determining an acceleration or deceleration of the vehicle; and determining an acceleration or deceleration of the object, wherein determining the relative stopping distance between the vehicle and the object is further based on the acceleration or deceleration of the vehicle and the acceleration or deceleration of the object.

S. The one or more non-transitory computer-readable media of paragraph Q or R, wherein: determining the relative stopping distance between the vehicle and the object is further based on at least one of a number of occupants in the vehicle, a weight of vehicle, weather conditions, road slope, road curvature, human reaction time, or road conditions.

T. The one or more non-transitory computer-readable media of any of paragraphs Q-S, wherein: determining the relative stopping distance between the vehicle and the object is further based on a maximum stopping rate associated with the object and an estimated reaction time associated with the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
determining a first location and a first velocity associated with a first autonomous vehicle;
determining a second location and a second velocity associated with a second vehicle;
determining, based on the first location, the second location, the first velocity, the second velocity, and a first maximum deceleration value associated with a comfort driving level, a relative stopping distance between the first autonomous vehicle and the second vehicle;
determining that the relative stopping distance is less than a threshold distance;
responsive to determining that the relative stopping distance is less than the threshold distance:
increasing, preemptive to determining a likelihood of an adverse event related to the second vehicle, the first maximum deceleration value to a second maximum deceleration value associated with a maximum stopping level, the maximum stopping level based at least in part on at least one of a vehicle type or vehicle classification of the first autonomous vehicle;
determining the likelihood of the adverse event related to the second vehicle based at least in part on the second maximum deceleration value; and
determining, by a vehicle computing device, a trajectory for the first autonomous vehicle based at least in part on the second maximum deceleration value, the trajectory comprising an indication of a desired direction, velocity, and acceleration of the first autonomous vehicle; and
controlling, based at least in part on the trajectory, a steering operation and a braking operation of the first autonomous vehicle in an environment to avoid the adverse event related to the second vehicle, independent of requiring the first autonomous vehicle to use the second maximum deceleration value.

2. The system of claim 1, the operations further comprising:
determining a first acceleration of the first autonomous vehicle; and
determining a second acceleration of the second vehicle, wherein determining the relative stopping distance between the first autonomous vehicle and the second vehicle is further based on the first acceleration and the second acceleration.

3. The system of claim 2, wherein:
the second acceleration of the second vehicle is determined based at least in part on a type or classification of the second vehicle.

4. The system of claim 1, wherein:
determining the relative stopping distance between the first autonomous vehicle and the second vehicle is further based on a maximum stopping rate by the second vehicle and an estimated reaction time determined based at least in part on a time required to determine the trajectory for the first autonomous vehicle by the vehicle computing device and control the first autonomous vehicle to brake based at least in part on the trajectory.

5. The system of claim 1, wherein:
the vehicle computing device determines trajectories based at least in part on a maximum deceleration value setting used to determine trajectories based at least in part on a permission to apply braking up to and no greater than the value of the maximum deceleration value setting;
the vehicle computing device uses the first maximum deceleration value as a default value for the maximum deceleration value setting during normal vehicle operation; and
the trajectory for the first autonomous vehicle based at least in part on the second maximum deceleration value:
is based at least in part on an updated maximum deceleration value setting updating the permission to an updated permission to apply braking up to and no greater than the second maximum deceleration value, and
comprises an activity independent of requiring the first autonomous vehicle to use the second maximum deceleration value.

6. A method implemented by one or more processors of a vehicle, the method comprising:
determining a first location and a first velocity of the vehicle;
determining a second location and a second velocity of an object in an environment proximate the vehicle;

determining, based on the first location and the second location, a relative stopping distance between the vehicle and the object;

determining that the relative stopping distance is less than a threshold distance;

responsive to determining that the relative stopping distance is less than the threshold distance:

increasing, preemptive to determining a likelihood of an adverse event related to the object, a first maximum deceleration value associated with a comfort level to a second maximum deceleration value associated with a maximum stopping level, the maximum stopping level based at least in part on at least one of a vehicle type or vehicle classification of the vehicle;

determining the likelihood of the adverse event related to the object based at least in part on the second maximum deceleration value; and determining a trajectory for the vehicle based at least in part on the second maximum deceleration value, the trajectory comprising an indication of a desired direction, velocity, and acceleration of the vehicle; and controlling, based at least in part on the trajectory, at least one of a steering operation or a braking operation of the vehicle in the environment independent of requiring the vehicle to use the second maximum deceleration value.

7. The method of claim 6, wherein:
determining the relative stopping distance between the vehicle and the object is further based on at least one of a maximum possible deceleration of the object, road conditions, road slope, road curvature, human reaction time, or lighting conditions.

8. The method of claim 6, further comprising:
determining a first acceleration of the vehicle; and
determining a second acceleration of the object,
wherein determining the relative stopping distance between the vehicle and the object is further based on the first acceleration and the second acceleration.

9. The method of claim 6, further comprising:
determining the second maximum deceleration value based at least in part on a type or a classification of the object.

10. The method of claim 6, further comprising:
reducing at least one of a maximum steering rate or a maximum steering angle responsive to increasing the first maximum deceleration value to the second maximum deceleration value.

11. The method of claim 6, wherein:
determining the relative stopping distance between the vehicle and the object is further based on at least one of a number of occupants in the vehicle, a weight of vehicle, weather conditions, or road conditions.

12. The method of claim 6, wherein:
determining the relative stopping distance is based on one or more of an initial distance between the vehicle and the object, a maximum deceleration of the vehicle, a maximum deceleration of the object, an initial velocity of the vehicle, an initial velocity of the object, road conditions, or weather conditions.

13. The method of claim 6, wherein:
determining the trajectory is further based on a cost associated with the second maximum deceleration value.

14. The method of claim 6, wherein:
determining the relative stopping distance between the vehicle and the object is further based on a maximum stopping rate associated with the object and an estimated reaction time associated with the vehicle.

15. The method of claim 6, wherein the relative stopping distance is determined based at least in part on an expected stopping rate associated with the object, the expected stopping rate being a known maximum object stopping rate.

16. The method of claim 6, wherein:
increasing the first maximum deceleration value is responsive to determining that the relative stopping distance is less than the threshold distance and identifying factors which indicate the likelihood of an adverse event, wherein the factors which indicate the likelihood of an adverse event comprise at least one of a pedestrian stepping into a driving lane, another vehicle laterally entering a roadway, another vehicle changing lanes, another vehicle predicted to cut in front of the vehicle, another vehicle predicted to go out of turn, or a presence of a bicyclist.

17. One or more non-transitory computer-readable media storing instructions that, when executed, cause one or more processors to perform operations comprising:

determining a first location and a first velocity of a vehicle;

determining a second location and a second velocity of an object;

determining, based on the first location, the second location, the first velocity, and the second velocity, a relative stopping distance between the vehicle and the object;

determining that the relative stopping distance is less than a threshold distance;

responsive to determining that the relative stopping distance is less than the threshold distance:

increasing, preemptive to determining a likelihood of an adverse event related to the object, a first maximum deceleration value associated with a comfort level to a second maximum deceleration value associated with a maximum stopping level, the maximum stopping level based at least in part on at least one of a vehicle type or vehicle classification of the vehicle;

determining the likelihood of the adverse event related to the object based at least in part on the second maximum deceleration value; and determining, by a vehicle computing device, a trajectory for the vehicle based at least in part on the second maximum deceleration value, the trajectory comprising an indication of a desired direction, velocity, and acceleration of the vehicle; and controlling, based at least in part on the trajectory, a steering operation and a braking operation of the vehicle in an environment to avoid the adverse event related to the object, independent of requiring the vehicle to use the second maximum deceleration value.

18. The one or more non-transitory computer-readable media of claim 17, the operations further comprising:
determining an acceleration or deceleration of the vehicle; and
determining an acceleration or deceleration of the object, wherein determining the relative stopping distance between the vehicle and the object is further based on the acceleration or deceleration of the vehicle and the acceleration or deceleration of the object.

19. The one or more non-transitory computer-readable media of claim 17, wherein:
determining the relative stopping distance between the vehicle and the object is further based on at least one of a number of occupants in the vehicle, a weight of vehicle, weather conditions, road slope, road curvature, human reaction time, or road conditions.

20. The one or more non-transitory computer-readable media of claim 17, wherein:
    determining the relative stopping distance between the vehicle and the object is further based on a maximum stopping rate associated with the object and an estimated reaction time associated with the vehicle.

* * * * *